United States Patent [19]

Sung et al.

[11] Patent Number: 5,524,181
[45] Date of Patent: Jun. 4, 1996

[54] METHOD FOR CHANGING COLOR PRINTING MODE OR SUBSTITUTING MARKING MATERIALS IN A HIGHLIGHT COLOR PRINTING MACHINE

[75] Inventors: Chung-Mei Sung, Rochester; Wilbert D. Douglas, Pittsford, both of N.Y.

[73] Assignee: Xerox Corporation, Stamford, Conn.

[21] Appl. No.: 151,460

[22] Filed: Nov. 15, 1993

[51] Int. Cl.[6] ............................................. G06K 15/00
[52] U.S. Cl. ......................... 395/104; 395/113; 395/109
[58] Field of Search ................................. 395/104, 101, 395/114, 112, 110, 109, 113; 358/294

[56] References Cited

U.S. PATENT DOCUMENTS

| 4,078,929 | 3/1978 | Gundlach | 96/1.2 |
|---|---|---|---|
| 5,129,639 | 7/1992 | De Hority | 270/1.1 |
| 5,167,013 | 11/1992 | Hube et al. | 395/110 |
| 5,229,814 | 7/1993 | Hube et al. | 355/203 |
| 5,249,061 | 9/1993 | Nagashima et al. | 358/296 |
| 5,319,464 | 6/1994 | Douglas et al. | 395/114 |
| 5,332,320 | 7/1994 | Ohara | 395/112 |

*Primary Examiner*—Mark R. Powell
*Assistant Examiner*—Tracy M. Legree
*Attorney, Agent, or Firm*—Gary B. Cohen

[57] ABSTRACT

There is provided a method of printing a job in a printing system adapted to produce prints, representative of the job, with one or more marking materials. The method includes the steps of programming the job to produce a first selected quantity of prints with a first marking material or a second marking material in the event the first marking material is unavailable, and determining that the printing system is unable to produce the first selected quantity of prints with the first marking material. In response to the determining step, the printing machine produces the first selected quantity of prints with the second marking material.

16 Claims, 7 Drawing Sheets

METHOD FOR CHANGING COLOR PRINTING MODE OR SUBSTITUTING MARKING MATERIALS IN A HIGHLIGHT COLOR PRINTING MACHINE

The present invention relates generally to a technique for printing a job on a single-pass color printing machine and, more specifically, to a method for printing selected portions of the job automatically in a second marking material when it is determined that the job cannot be printed in an originally called-for first marking material.

In electrophotographic applications such as xerography, a charge retentive surface is electrostatically charged and exposed to a light pattern of an original image to be reproduced for selectively discharging the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder referred to as "toner". Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. Subsequent to development and transfer, excess toner left on the charge retentive surface is cleaned from the surface. The process is well known, and useful for light lens copying from an original, and printing applications from electronically generated or stored originals, where a charged surface may be imagewise discharged in a variety of ways.

Although a preponderance of the toner forming the image is transferred to the paper during transfer, some toner invariably remains on the charge retentive surface, it being held thereto by relatively high electrostatic and/or mechanical forces. A commercially successful mode of cleaning employed in automatic xerography utilizes a brush with soft fiber bristles which have suitable triboelectric characteristics. While the bristles are soft they are sufficiently firm to remove residual toner particles from the charge retentive surface. In addition, webs or belts of soft fibrous or tacky materials and other cleaning systems are known.

A process referred to as "highlight color imaging" has been accomplished by employing basic xerographic techniques. The concept of tri-level, highlight color xerography is described in the following patent:

U.S. Pat. No. 4,078,929

Patentee: Gundlach

Issued: Mar. 14, 1978

U.S. Pat. No. 4,078,929 discloses the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In highlight color xerography as taught by Gundlach, the xerographic contrast on the charge retentive surface or photoreceptor is divided into three levels, rather than two levels as is the case in conventional xerography. The photoreceptor is charged, typically to −900 volts, and exposed imagewise, such that one image corresponding to charged image areas (which are subsequently developed by charged-area development, i.e. CAD) stays at the full photoreceptor potential ($V_{cad}$ or $V_{ddp}$). $V_{ddp}$ is the voltage on the photoreceptor due to the loss of voltage while the photoreceptor remains charged in the absence of light, otherwise known as dark decay. Another image is exposed to discharge the photoreceptor to its residual potential, i.e. $V_{dad}$ or $V_c$ (typically −100 volts), which $V_c$ corresponds to discharged area images that are subsequently developed by discharged-area development (DAD). The background area is exposed so as to reduce the photoreceptor potential to halfway between the $V_{cad}$ and $V_{dad}$ potentials, (typically −500 volts) and is referred to as $V_{white}$. The CAD developer is typically biased about 100 volts closer to $V_{cad}$ than $V_{white}$ (about −600 volts), and the DAD developer system is biased about 100 volts closer to $V_{dad}$ than $V_{white}$ (about −400 volts). As will be appreciated, the highlight color need not be a different color but may have other distinguishing characteristics. For example, one toner may be magnetic and the other non-magnetic.

As follows from the above description, a highlight color printing machine can operate in one of three operational modes, namely "highlight color", "monochrome-color" or "monochrome-black". Additionally, the toner or marking material used to generate highlight or monochrome color can assume one of a plurality of colors. Preferably, a print job is executed on the highlight color printing machine by providing a program indicating selections for color printing mode and marking material color. In executing a print job, it is not always possible, from a user's point of view, to control either the mode in which the machine is operated or the color in which the machine prints. For example, when the printing machine runs out of the color toner called for by the print job program, typically, the print job is faulted so that the program submitter must either provide a new toner selection consistent with what is available at the printing machine or wait until the programmed color toner is available. In another example, a print job is faulted when its corresponding program calls for execution of the print job in a color printing mode which is not presently available.

For situations in which fonts or stock, unavailable at a printing machine, are called for, it is known that substitute fonts or stock can be provided so that a job need not be faulted. The following patents, the pertinent portions of which are incorporated herein, respectively relate to substitution schemes for fonts and stock:

U.S. Pat. No. 5,167,013

Patentees: Hube et al.

Issued: Nov. 24, 1992

U.S. Pat. No. 5,229,814

Patentees: Hube et al.

Issued: Jul. 20, 1993

Another substitution scheme is disclosed by the following patent, the pertinent portions of which are incorporated herein:

U.S. Pat. No. 5,129,639

Patentee: DeHority

Issued: Jul. 14, 1992

U.S. Pat. No. 5,129,639 discloses a system, usable with a network for comparing a set of print job requirements to a printer capability and determining the best match therebetween. When a mismatch occurs, the system determines the best match between requested, unavailable stock characteristics/finishing features and available stock characteristics/finishing features by determining a mismatch magnitude between the requested requirements and the machines capabilities. The stock characteristic/finishing feature with the lowest mismatch magnitude is designated.

In the above-described highlight color printing system, a user is often intent on using a highlight color to emphasize certain portions of his or her document. At the same time, the particular color used to provide the emphasis is of little importance. Hence, substituting colors for jobs in a highlight color printing system, rather than faulting the jobs could be desirable from the user's point of view. While the above references teach the use of substitution schemes for such areas as font management, stock management and finishing, they do not accommodate for those situations in which the substitution of a requested marking material with an available marking material, or the switching of a printing machine from an unavailable color printing mode to an available color printing mode, would be appropriate.

In accordance with one aspect of the disclosed embodiment of the present invention there is provided a method of printing a job in a printing system adapted to produce prints, representative of the job, with one or more marking materials, including the steps of: programming the job to produce a first selected quantity of prints with a first marking material or a second marking material in the event the first marking material is unavailable; determining that the printing system is unable to produce the first selected quantity of prints with the first marking material; and in response to the determining step, causing the printing machine to produce the first selected quantity of prints with the second marking material.

In accordance with another aspect of the disclosed embodiment of the present invention there is provided a method of printing a job in a printing system adapted to produce prints, representative of the job, in one of a plurality of color printing modes, including the steps of: programming the job to produce selected prints in the first color printing mode or in a second color printing mode in the event the first color printing mode is unavailable; determining that the printing system is unable to produce the selected prints in the first color printing mode; and in response to the determining step, causing the printing machine to produce the selected prints in the second color printing mode.

These and other aspects of the invention will become apparent from the following description, the description being used to illustrate a preferred embodiment of the invention when read in conjunction with the accompanying drawings.

Figure 5:
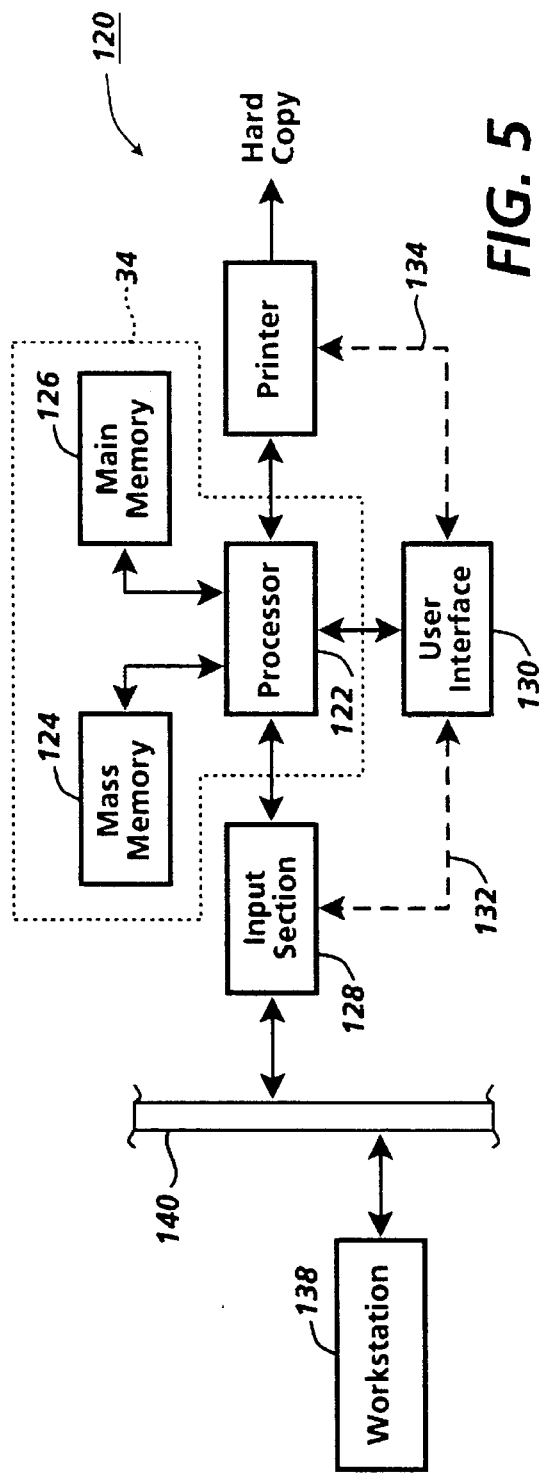
FIG. 5 is a schematic, block diagrammatic view of an electronic printing machine in which the present invention can be carried out.
Figure 6:
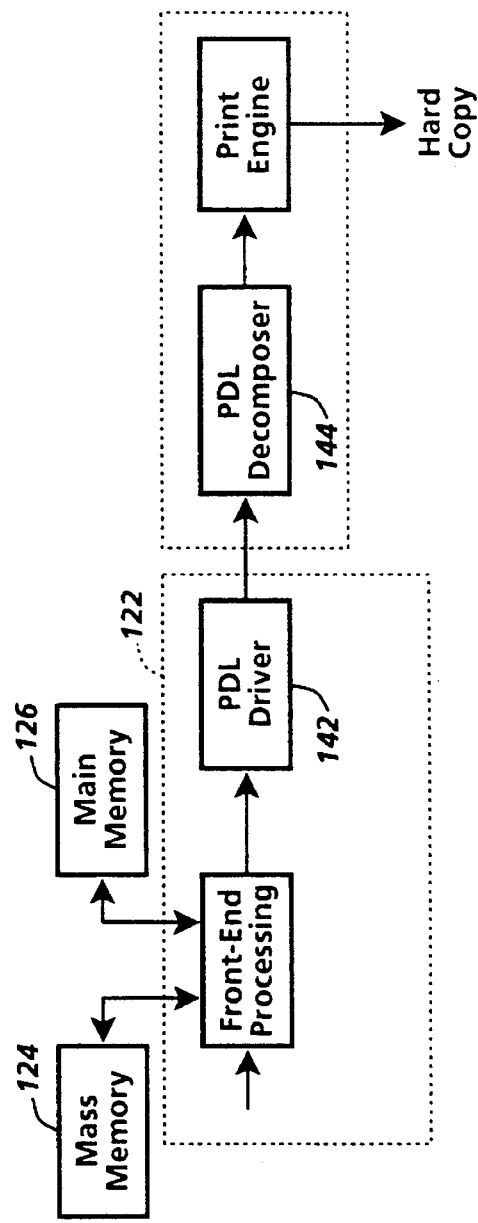
Figure 7:
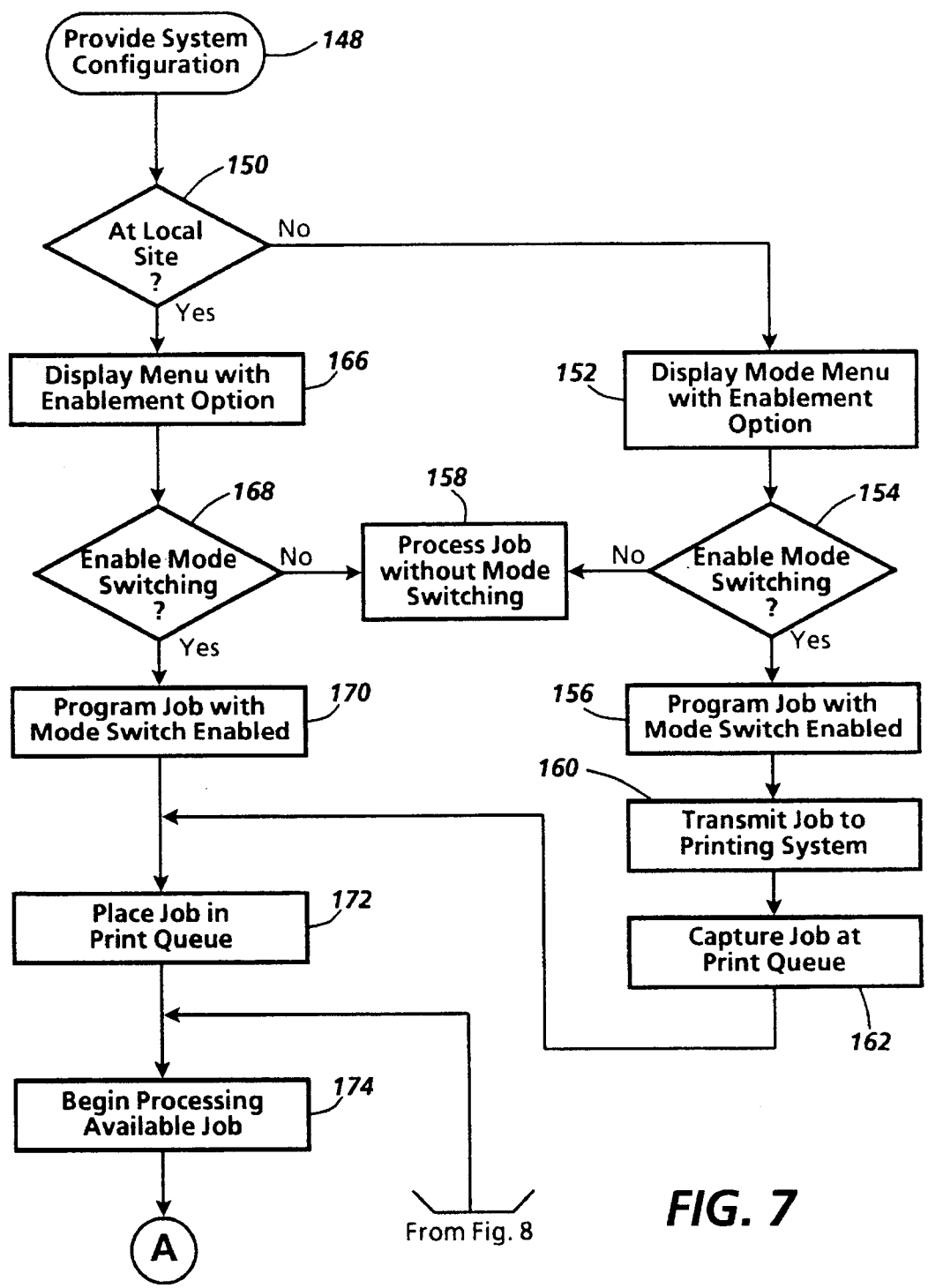
Figure 8:
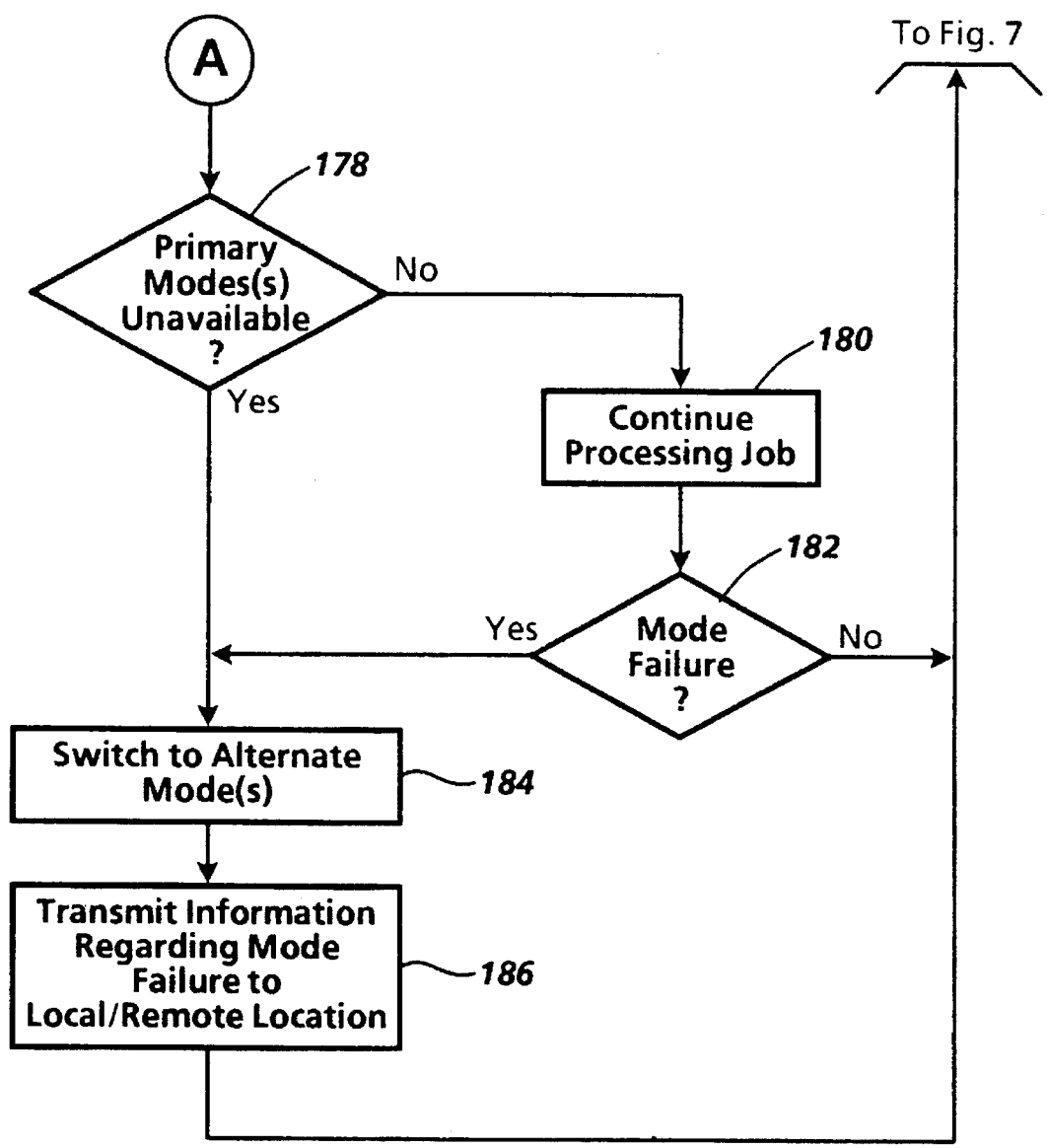

FIG. 6 is a schematic, block diagrammatic view of a processor/printer interface for the printing machine shown in FIG. 5; and FIGS. 7 and 8 conjunctively represent a flow diagram illustrating a technique for automatically switching a color printing mode of the printing machine or substituting a second marking material for a first marking material when the first marking material is unavailable at the printing machine.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
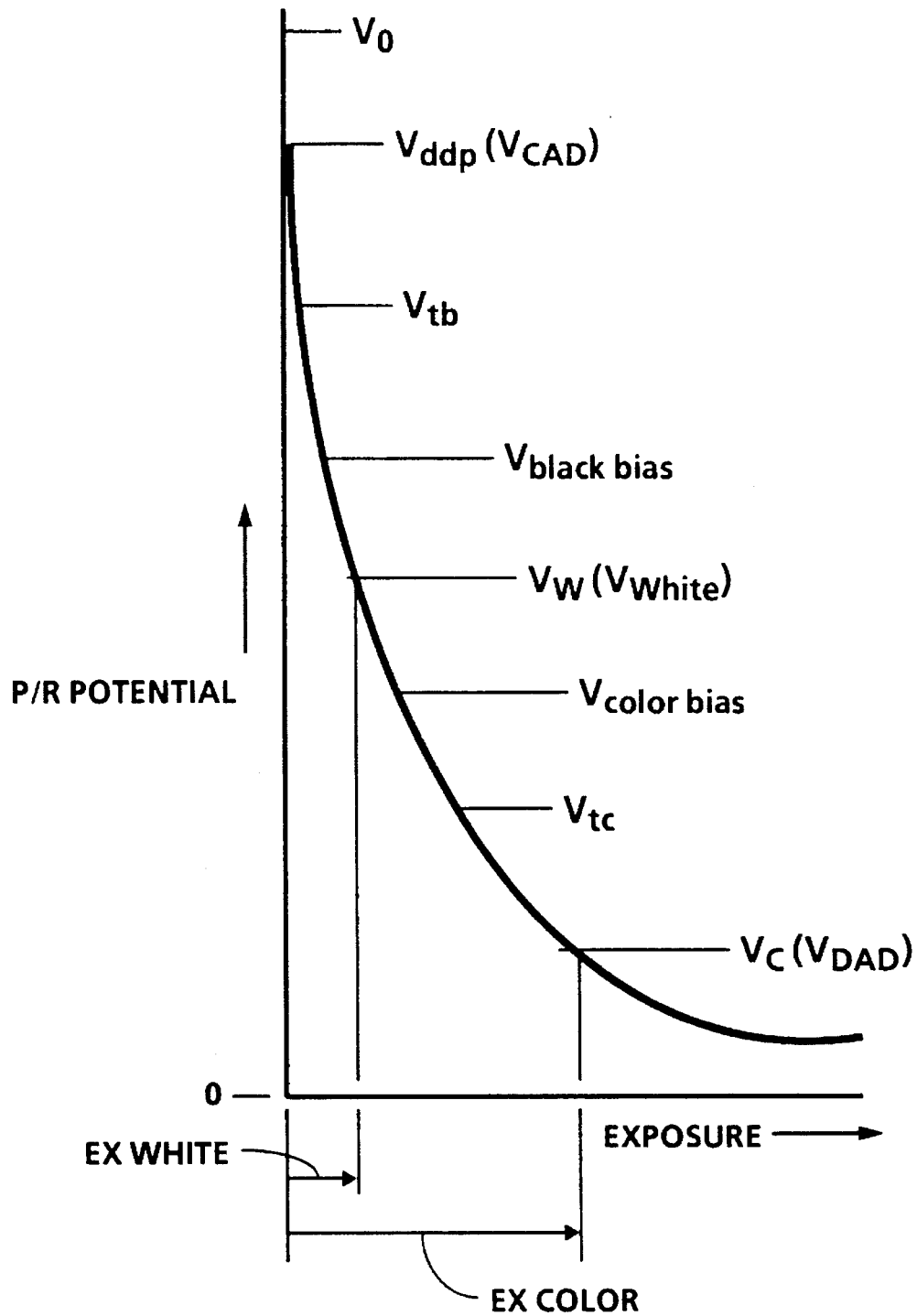
FIG. 1 is a plot of photoreceptor potential versus exposure, for a tri-level electrostatic latent image.
Figure 2:
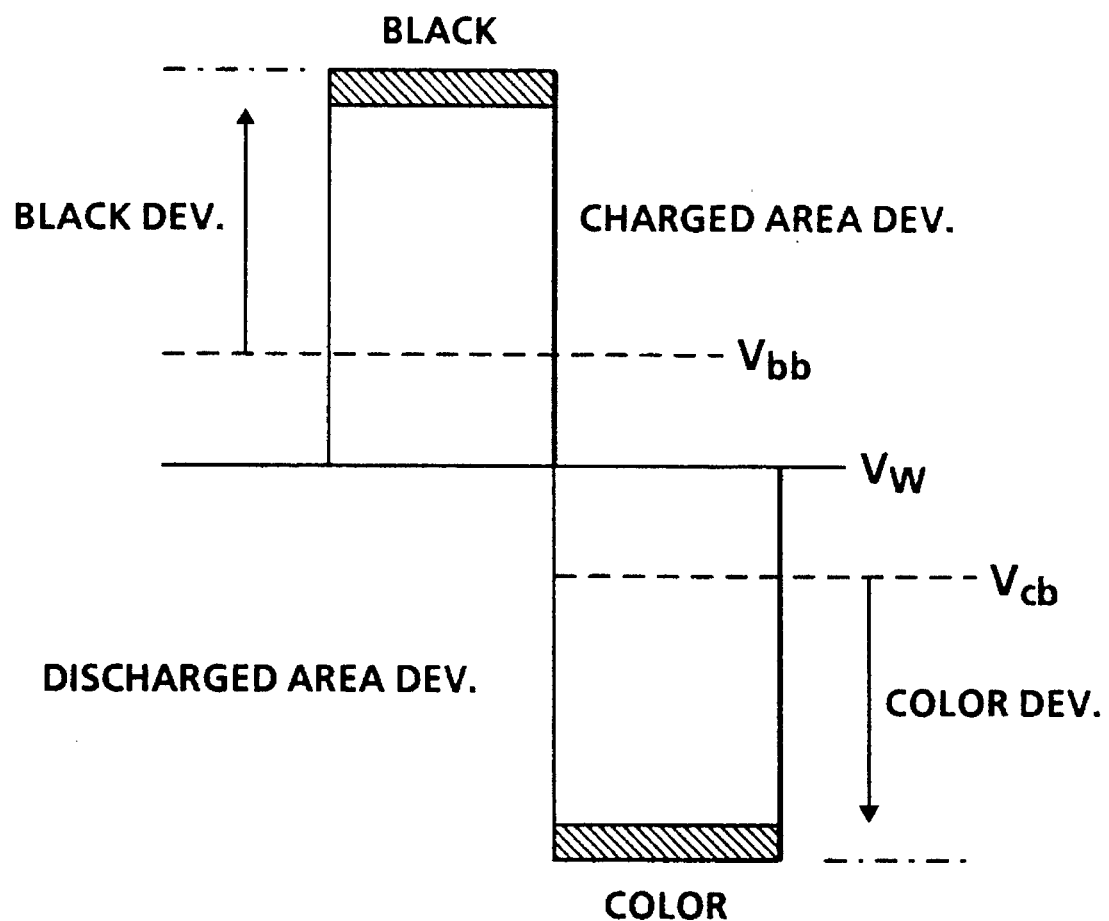
FIG. 2 is a plot of photoreceptor potential representing particular single-pass highlight color latent image characteristics.

Referring to FIGS. 1 and 2, the concept of tri-level highlight color imaging is described generally. For a photo-induced discharge curve ("PIDC") of FIG. 2, $V_0$ represents the initial charge level, $V_{ddp}$ ($V_{CAD}$) the dark discharge potential (unexposed), $V_{White}$, the white or background discharge level, and $V_c(V_{DAD})$ the photoreceptor residual potential. In one example, nominal voltage magnitudes for $V_{CAD}$, $V_{White}$ and $V_{DAD}$ are 788 v, 423 v and 123 v, respectively.

In highlight color applications, color discrimination in the development of the electrostatic latent image is achieved by passing the photoreceptor, with a latent image disposed thereon, through first and second developer housings and biasing the housings to voltages which are offset from the background voltage $V_{White}$. In one illustrated embodiment, the second housing contains developer with positively charged black toner. Accordingly, the toner from the second housing is driven to the most highly charged ($V_{ddp}$) areas of the latent image by the electrostatic field between the photoreceptor and the development rolls in the second housing, the second housing development rolls being biased at $V_{black\ bias}(V_{bb})$. The first housing contains negatively charged colored toner. Accordingly, the toner from the first housing is urged towards parts of the latent image at the residual potential, namely $V_{DAD}$, by the electrostatic field existing between the photoreceptor and the development rolls of the first housing, the first housing rolls being biased to $V_{color\ bias}$, ($V_{cb}$). In one example, nominal voltage magnitudes for $V_{bb}$ and $V_{cb}$ are 641 v and 294 v, respectively.

Figure 3:
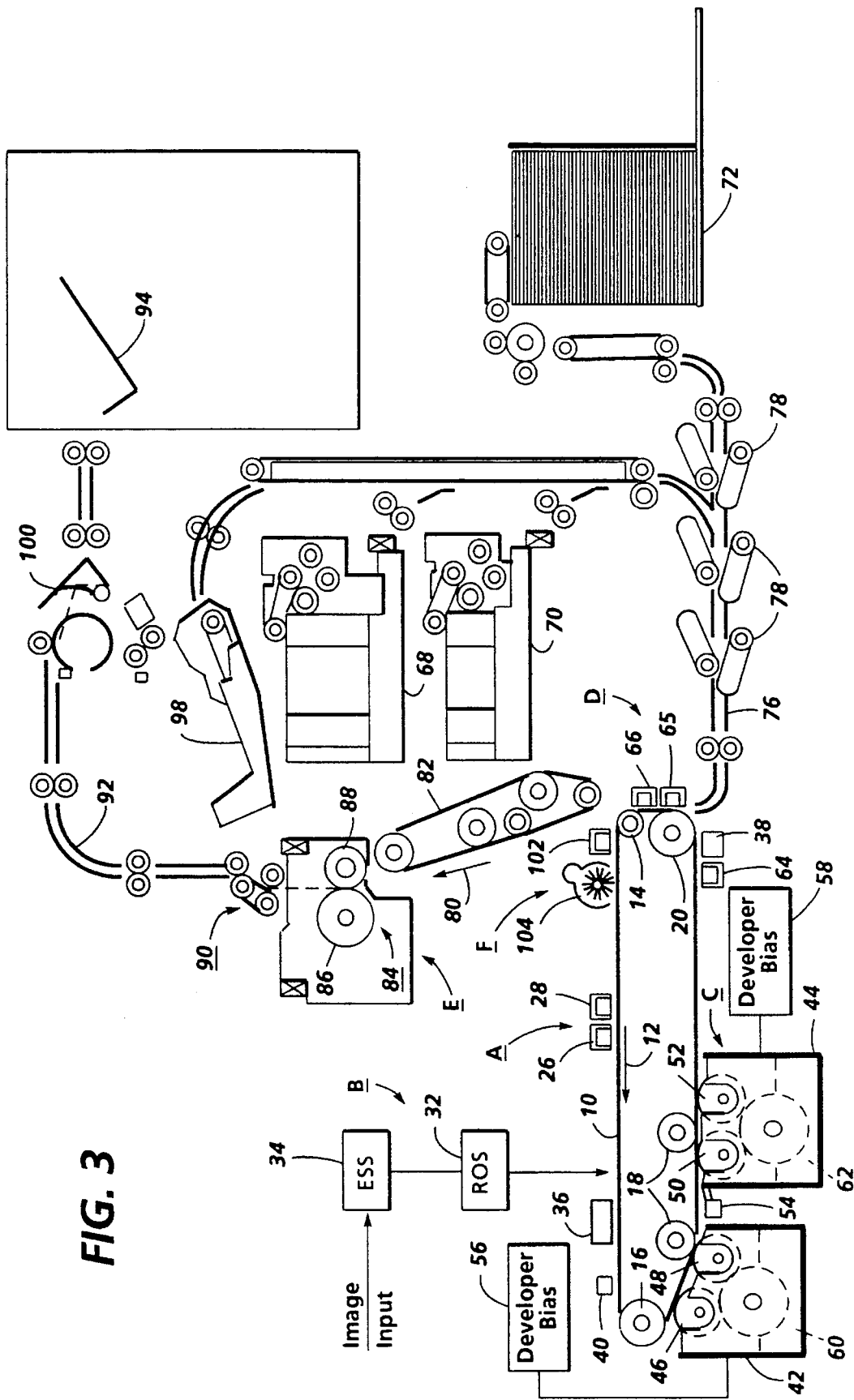
FIG. 3 is a schematic view of a printing machine with which the present invention can be employed.

Referring to FIG. 3, a reproduction machine in which the present invention finds advantageous use employs a photoreceptor belt 10 having a charge retentive surface. Belt 10 moves in the direction of arrow 12 to advance successive portions of the belt sequentially through the various processing stations disposed about the path of movement thereof.

Belt 10 is entrained about stripping roller 14, tension roller 16, idler rollers 18, and drive roller 20. Drive roller 20 is coupled to a motor (not shown) by suitable means such as a belt drive. Belt 10 is maintained in tension by a pair of springs (not shown) resiliently urging tension roller 16 against belt 10 with the desired spring force. Both stripping roller 14 and tension roller 16 are rotatably mounted. These rollers are idlers which rotate freely as belt 10 moves in the direction of arrow 12. Portions of the belt 10 pass through charging station A. At charging station A, a pair of corona devices 26 and 28 charge successive portions of the photoreceptor belt 10 to a relatively high, substantially uniform negative potential.

At exposure station B, the uniformly charged photoreceptor is exposed to a laser based scanning device 32 or ROS, which, in accordance with a driving ESS 34, discharges the photoreceptor to one of three charge levels in accordance with a stored image. This records an electrostatic latent image on the belt which corresponds to the informational area contained within electronically stored original information. The ROS could be replaced with a conventional electrophotographic exposure arrangement.

In the preferred mode of operation, the charge retentive surface of the belt 10, which is initially charged to a voltage $V_0$, undergoes dark decay to a level $V_{ddp}$ or $V_{CAD}$ equal to about $-900$ volts to form CAD images. Upon being exposed at the exposure station B, the photoreceptor is discharged to $V_c$ or $V_{DAD}$ equal to about $-100$ v to form a DAD image which is about zero or ground potential in the highlight color parts of the image. During exposure, the charge retentive surface of the belt 10 is also discharged to $V_{White}$, the magnitude of $V_{White}$ equaling approximately $-500$ v in the background (white) areas.

Referring still to FIG. 3, a patch generator is designated by the numeral 36. In one example, the generator 36 comprises a conventional exposure device, and serves to record test or control patches in interdocument zones (not shown), the test patches being used both in a developed and undeveloped condition for controlling various process functions. An Infra-Red densitometer (IRD) 38 is utilized to sense or measure the reflectance of test patches after they have been developed. It should be recognized that each test patch can be recorded and developed with multiple toners having differing polarities. Thus, the patch generator 36 is preferably adapted to provide different levels of exposure for any one given interdocument zone. A first electrostatic voltmeter (ESV$_1$) 40 is positioned downstream of the patch generator 36 for monitoring certain electrostatic charge levels (i.e. $V_{DAD}$, $V_{CAD}$, $V_{White}$, and $V_{tc}$) on various portions of the photoreceptive belt 10.

At development station C, a magnetic brush development system advances developer materials into contact with an electrostatic latent image on the photoreceptor. The development station C comprises a first developer housing 42 and second developer housing 44. Preferably, the housing 42 contains a pair of magnetic brush developer rollers 46, 48 while the housing 44 contains a pair of magnetic brush developer rollers 50, 52. Each pair of rollers advances its respective developer material into contact with the latent image. Appropriate developer biasing is accomplished via power supplies 56 and 58, the power supplies 56, 58 being electrically coupled with respective developer housings 42, 44. A pair of toner replenishment devices (not shown) are provided for replacing the toner as it is depleted from the developer housing structures 42, 44.

Color discrimination in the development of the electrostatic latent image is achieved by passing the photoreceptor past the two developer housings 42 and 44 in a single pass with the magnetic brush rolls 46, 48, 50 and 52 electrically biased to voltages which are offset from the background voltage $V_{White}$ in a direction depending on the polarity of toner in the housing. In the illustrated embodiment of FIG. 3, the housing 42 contains negatively charged blue conductive magnetic brush (CMB) developer 60. Accordingly, the blue toner is driven to the least highly charged areas at the potential $V_{DAD}$ of the latent images by the electrostatic development field ($V_{DAD}$- $V_{color\ bias}$) between the photoreceptor and the development rolls 46, 48. On the other hand, the housing 44 contains positively charged black toner 62. Accordingly, the black toner is urged towards the parts of the latent images at the most highly charged potential $V_{CAD}$ by the electrostatic development field ($V_{CAD}$-$V_{black\ bias}$) existing between the photoreceptor and the development rolls 50, 52. A second electrostatic voltmeter (ESV$_2$) 54 is positioned downs of the first developer housing 42 for monitoring certain electrostatic charge levels (i.e. $V_{DAD}$, $V_{CAD}$, $V_{White}$, $V_{tb}$ and $V_{tc}$) on various portions of the photoreceptive belt 10.

Preferably, the rollers 46 and 48 are biased using a chopped DC bias via power supply 56, while the rollers 50 and 52 are biased using a chopped DC bias via power supply 58. The expression chopped DC ("CDC") bias refers to the process of alternating a developer housing between two potentials, namely a first potential roughly representing the normal bias for the DAD developer, and a second potential roughly representing a bias that is considerably more negative than the normal bias. The first potential is identified as $V_{Bias\ Low}$ while the second potential as $V_{Bias\ High}$. Further details regarding CDC biasing are provided in U.S. Pat. No. 5,080,988 to Germain et al., the pertinent portions of which are incorporated herein by reference.

Because the composite image developed on the photoreceptor consists of both positive and negative toner, a negative pretransfer dicorotron 64 is employed to condition the toner for effective transfer to a substrate using positive corona discharge. The concept of the invention would not be altered by conditioning the toner for transfer with negative corona discharge. Subsequent to providing pretransfer, belt 10 advances the developed latent image to transfer station D. At transfer station D, a sheet of support material such as a paper copy sheet is moved into contact with the developed latent images on belt 10 and a corona generating device 65 charges the copy sheet to the proper potential so that it is tacked to photoreceptor belt 10 and the toner powder image is attracted from photoreceptor belt 10 to the sheet. After transfer, a corona generator 66 charges the copy sheet with an opposite polarity to detack the copy sheet for belt 10, whereupon the sheet is stripped from belt 10 at stripping roller 14.

Sheets of support material are advanced to transfer station D from supply trays 68, 70 and 72, which supply trays may hold different quantities, sizes and types of support materials. Sheets are advanced to transfer station D along conveyor 76 and rollers 78. After transfer, the sheet continues to move in the direction of arrow 80 onto a conveyor 82 which advances the sheet to fusing station E.

Fusing station E, which includes a fuser assembly, indicated generally by the reference numeral 84, serves to permanently affix the transferred toner powder images to the sheets. Preferably, fuser assembly 84 includes a heated fuser roller 86 adapted to be pressure engaged with a back-up roller 88 with the toner powder images contacting fuser roller 86. In this manner, the toner powder image is permanently affixed to the sheet.

After fusing, copy sheets bearing fused images are directed through decurler 90. Chute 92 guides the advancing sheet from decurler 90 to catch tray 94 or a finishing station for binding, stapling, collating etc. and removal from the machine by the operator. Alternatively, the sheet may be advanced to a duplex tray 98 from duplex gate 100 from which it will be returned to the processor and conveyor 76 for receiving second side copy.

A pre-clean corona generating device 102 is provided for exposing the residual toner and contaminants (hereinafter, collectively referred to as toner) to positive charges to thereby shift the charge distribution thereon in a positive direction for more effective removal at cleaning station F. The cleaning station F further includes an electrically insulative, rotatably mounted cleaning member designated by the numeral 104. In the preferred embodiment, the member 104 is a fibrous brush in contact with the surface of the belt 10. The insulative brush is capable of being charged up during rotation, via triboelectric interaction with other cleaning members, for attracting toner(s) of the opposite polarity. Alternatively, the brush could be a conductive brush adapted to be biased for attracting toner(s) of the opposite polarity. A conductive brush suited for such cleaning is disclosed in U.S. Pat. No. 4,819,026 to Lange et al., the pertinent portions of which are incorporated by reference. In another example, two brushes could be mounted in cleaning relationship relative to the surface of the belt 10 to achieve redundancy in cleaning. It is contemplated that residual toner remaining on charge retentive surface of belt 10 after transfer will be reclaimed and returned to the developer station C by any one of several well known reclaim arrangements.

Figure 4:
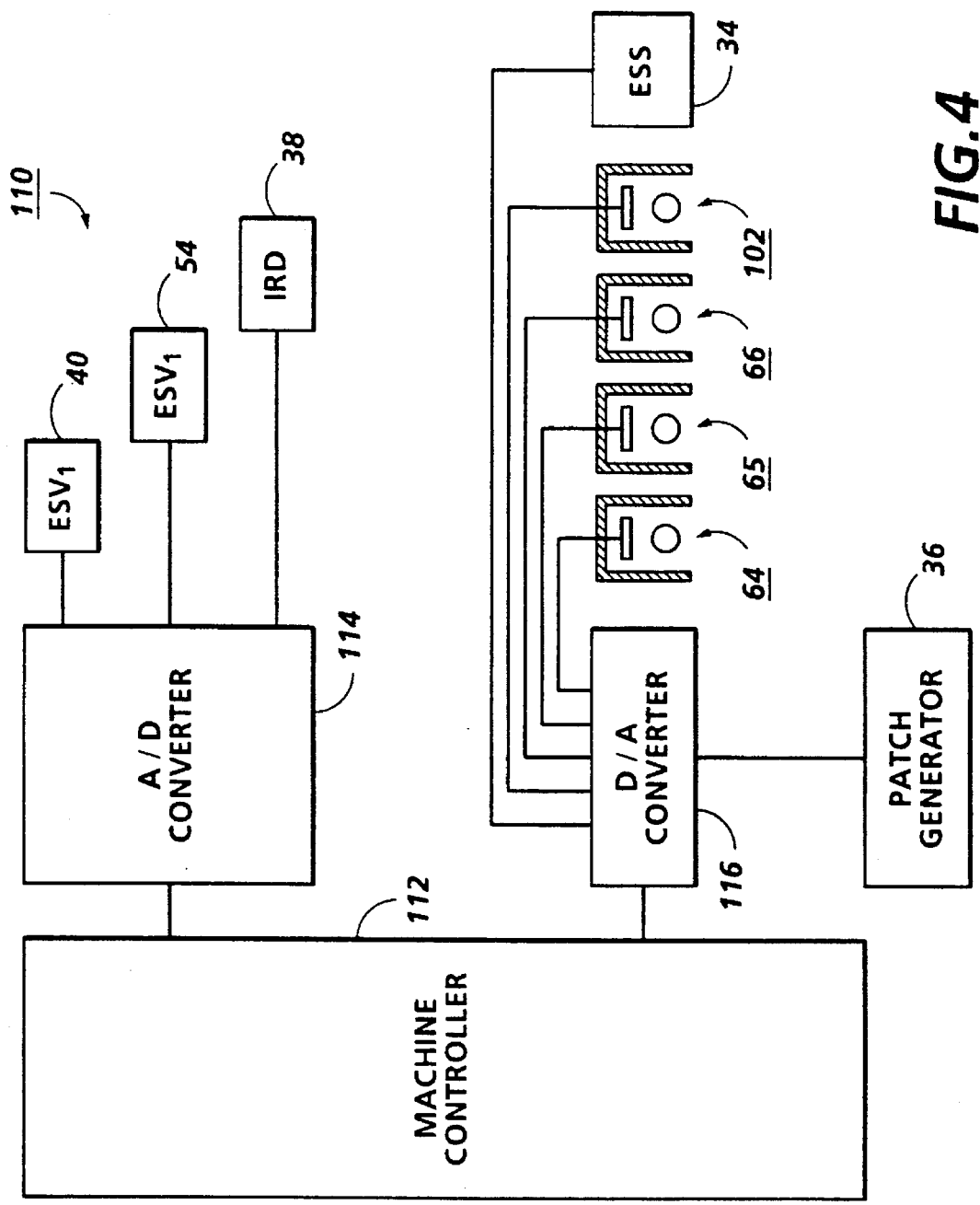
FIG. 4 is a schematic view of a control circuit used to control various components of the printing machine of FIG. 3.

Referring to FIG. 4, a control circuit for use with the above-described xerographic engine is designated with the numeral 110. In the illustrated embodiment of FIG. 5, the IRD 38, ESV1 40 and ESV2 54 are coupled with a machine controller 112 by way of an A/D converter 114, while the ESS 34, the patch generator 36 and the corona devices 64–66 and 102 are coupled with the controller 112 by way of a D/A converter 116. As will be appreciated by those skilled in the art, the machine controller 112 includes all of the appropriate circuitry for controlling the various devices coupled therewith and suitable memory for storing reference values corresponding to any measurements received from the ESV1, ESV2 or the IRD. In one embodiment the machine controller 112 could comprise a virtual machine control apparatus of the type disclosed in U.S. Pat. No. 4,475,156 to Federico et al.

Referring still to FIG. 4, preselected current levels are respectively applied across the corona devices 64–66 and 102 during cycleup or runtime to enable efficient transfer, detack and cleaning. That is, the respective applied current levels through the corona devices 64–65 are set to obtain optimal transfer, while the respective applied current levels through corona devices 66 and 102 are set to obtain optimal detack and cleaning.

Referring to FIG. 5, there is an electronic document processing system 120 for illustrating a preferred environment of the above-described print engine of FIG. 3. The document processing system 120 includes the ESS 34, the ESS 34 including a digital processor 122 with a main memory 124 and a mass memory 126. The document processing system 120 further includes an input section 128 for providing a job written in a printer page description language (PDL), and the printer of FIG. 3 for printing hardcopy renderings of selected image components obtained from the PDL. Furthermore, there is a user interface 130 for enabling a user to interact with the processor 122, the input section 128, and the printer.

As will be understood, the user interface 130 collectively represents the input devices through which the user enters image editing and manipulation instructions for the processor 122. Additionally, the interface 130 represents the output devices through which the user receives feedback with respect to the actions that are taken in response to the instructions that are entered by the user or otherwise, such as under program control. For example, the user interface 130 generally includes a keyboard or the like for entering use instructions, a monitor for giving the user a view of the process that is being performed by the processor 122, and a cursor controller for enabling the user to move a cursor for making selections from and/or for entering data into a process that is being displayed by the monitor (none of these conventional components is shown).

The illustrated document processing system 120 is centralized, so it has been simplified by assuming that all control instructions and all image editing and manipulation instructions are executed by the processor 122 under program control. In practice, however, the execution of these instructions may be handled by several different processors, some or all of which may have their own main memory and even their own mass memory. Likewise, either or both of the input section 128 and the printer may have their own respective user interface, as indicated by the dashed lines 132 and 134, respectively. Indeed, it will be evident that the document processing system 120 could be reconfigured to have a distributed architecture to operate with a remote input section and/or a remote printer (not shown). Data could be transferred from and to such remote input section and printer terminals via dedicated communication links or switched communication networks (also not shown).

In the preferred embodiment, the input section 128 communicates with a remote client, such as a workstation 138 by way of a network 140. Further details regarding network printing arrangements may be obtained by reference to the following references, the pertinent portions of which are incorporated herein: U.S. Pat. No. 5,129,639 to DeHority, U.S. Pat. No. 5,226,112 to Mensing et al. and U.S. patent application Ser. No. 07/898,761("'761 Application") entitled "Apparatus and Method for Multi-Stage/Multi-Process Decomposing", filed Jun. 12, 1993 by Bonk et al.

Referring to FIG. 6, the processor 122 preferably includes a PDL driver 142 for transferring to the printer PDL descriptions of the electronic document files that are selected for printing. Thus, the printer (FIGS. 3 and 5) is illustrated as having a PDL decomposer 144 for decomposing such PDL descriptions to produce corresponding bitmapped image file. It will be appreciated, particularly in view of the discussion in the '761 Application, that the decomposer 144 is capable of receiving PDL files from mass memory, such as disk, or from off the network on the fly.

Referring to FIGS. 7 and 8, a technique for conditionally switching an operational mode of the document processing system 120, is discussed. It will be appreciated that the concept of mode switching, in the present application refers to at least two distinct situations. That is, in one situation the highlight printing machine is switched from a first color printing mode to a second color printing mode, and in another situation the machine uses a second highlight color marking material, instead of a first highlight color marking material, to print portions of a job. To initiate the technique of FIGS. 7 and 8 (step 148), the document processing system is configured to effect a mode switch when appropriate. In one example, a suitable mode-switching routine, which, among other things, detects a request for an available mode and permits a mode switch when the requested mode is unavailable, is programmed into mass memory 126.

Referring to step 150, it follows from the description above, that the disclosed mode switching technique can be performed at a printer or across a network. Assuming that the technique is performed across a network, a job ticket, of the type shown in U.S. Pat. No. 5,170,340 to Prokop et al., the pertinent portions of which are incorporated herein, is displayed (step 152) for designating the various parameters of a job and indicating whether mode switching is allowable. As will be appreciated by those skilled in the art, the job ticket can be implemented with any suitable programming language suitable for developing user selectable property sheets. Preferably, the job ticket is programmed to provide a prompt (step 154), asking the user whether mode switching should be enabled. In one exemplary implementation, the user is provided with information regarding available alternative modes so that the user can program the job for an alternative marking material or alternative color printing mode. In one example of programming, the user would be asked if the highlight marking material used in printing is critical. For those cases of highlight color printing in which the color of the highlight color is not critical, the user will indicate, via step 156, that mode switching is permissible. If the user does not desire mode switching (step 158), the job is processed with mode switching disabled. For those instances in which mode switching is disabled, if a requested color printing mode or a requested marking material is unavailable for printing the job, the job is faulted and retained until the available color printing mode or marking material is available. Assuming, on the other hand, that mode switching is desired, the job is programmed with mode switching capability (step 156) and the job is transmitted to the document processing system 120 (step 160) where the programmed job is captured (step 162).

Referring again to step 150, for local jobs, a job ticket of the type described above, is displayed (step 166) and the user indicates whether he or she desires mode switching (step 168). Assuming that the user does not desire mode switching, then the process proceeds to step 158; otherwise the job is, via step 170, programmed with the mode switch enabled. As local or network jobs are programmed, representations thereof are placed in a print queue (not shown) (step 172) of the type discussed in U.S. Pat. No. 5,206,735 to Gauronski et al., the pertinent portions of which are incorporated herein.

As each job progresses to the top of the print queue, it is processed (step 174) in accordance with the requested job parameters and, if necessary, the mode switching routine stored in the mass memory 126. In processing the job, the following determinations, via step 178, are made:

whether the requested color printing mode (e.g. highlight color mode, monochrome-color mode or monochrome-black mode) can be implemented on the printer;

whether the requested marking material, e.g. color toner, can be provided by the printer; and whether the programmed job ticket provides for optional mode switching.

If the requested mode is available, then the printer begins processing the job (step 180) in accordance with the parameters designated in the job ticket. Assuming the job can be completed in the color printing mode or the marking material requested, then the process loops back to step 174 where the next available job is processed. On the other hand, assuming there is an operational mode failure during printing, (step 182) then the software of the present technique, via step 184, provides for switching to an alternative mode.

In the event that mode failure is detected at step 178, the process proceeds to the switching step 184. Subsequent to performing the switching step 184, information is transmitted to a suitable local/remote source (step 186) for indicating the nature of the mode failure. In one example, the information can be sent to, among others, the user interface 130, the workstation 138 and/or a remote diagnostic site (via remote interactive communications ("RIC")). A RIC arrangement suitable for facilitating diagnosis in the document processing system 120 is disclosed in U.S. Pat. No. 5,057,866 to Hill Jr. et, the pertinent portions of which are incorporated herein.

Numerous features of the above-described embodiment will be appreciated by those skilled in the art. In one aspect of the above-described embodiment, a second color printing mode is performed when a first color printing mode is unavailable. For example, when highlight color printing cannot be achieved for a job, due to lack of highlight color toner, the monochrome-color or monochrome-black printing mode is used to print the job. In another aspect of the above-described embodiment, when a requested marking material is unavailable, another marking material is provided in its place. This permits, for example, a job to be printed in highlight color even though the highlight color toner requested by the user is unavailable. The disclosed technique promotes flexibility in operation and maximizes job productivity in that the user can choose to obtain automatic mode switching and preclude job faulting. System integrity is maintained since automatic mode switching is not performed unless the user specifically expresses a willingness to do so by enabling suitable mode switching software.

What is claimed is:

1. A method of printing a job in a printing system adapted to produce prints, representative of the job, with one or more marking materials, comprising the steps of:

programming the job to produce a first selected quantity of prints with a first marking material or a second marking material in the event the first marking material is unavailable, wherein said programming step includes programming the job to produce a second selected quantity of prints with the first marking material and a third marking material, the second selected quantity of prints being produced with the second and third marking materials when it is determined that the printing system is unable to produce the first selected quantity of prints with the first marking material;

determining that the printing system is unable to produce the first selected quantity of prints with the first marking material; and in response to said determining step, causing the printing machine to produce the first selected quantity of prints with the second marking material.

2. The method of claim 1, further comprising the step of preventing the printing machine from producing the first selected quantity of prints unless a selected condition is met.

3. The method of claim 2, wherein the selected condition includes enabling a mode switch associated with the printing system.

4. The method of claim 3, in which the printing system includes a printing machine, further comprising the step of enabling the mode switch at a site disposed remotely of the printing machine.

5. The method of claim 1, in which it is determined, by way of said determining step, that the printing system is unable to produce the prints with either of the first marking material or the third marking material, wherein said causing step comprises causing the printing system to produce the second selected quantity of prints with the second marking material and a fourth marking material.

6. The method of claim 1, further comprising using a first color toner for the first marking material.

7. The method of claim 1, further comprising the step of faulting the job when the selected condition is not met.

8. The method of claim 1, further comprising the step of providing the first marking material with a magnetic property.

9. A method of printing a job in a printing system adapted to produce prints, representative of the job, in one of a plurality of color printing modes, comprising the steps of:

programming the job to produce selected prints in the first color printing mode or in a second color printing mode in the event the first color printing mode is unavailable;

determining that the printing system is unable to produce the selected prints in the first color printing mode; and in response to said determining step, causing the printing machine to produce the selected prints in the second color printing mode.

10. The method of claim 9, further comprising the step of preventing the printing machine from producing the selected prints unless a selected condition is met.

11. The method of claim 10, wherein the selected condition includes enabling a mode switch associated with the printing system.

12. The method of claim 11, in which the printing system includes a printing machine, further comprising the step of enabling the mode switch at a site disposed remotely of the printing machine.

13. The method of claim 10, further comprising the step of faulting the job when the selected condition is not met.

14. The method of claim 9, wherein said programming step includes programming the job to produce prints in the first color printing mode with a first color toner and a second color toner, and to produce prints in the second color printing mode with a third color toner and a fourth color toner.

15. The method of claim 14, further including the step of providing a fourth color toner with a composition substantially similar to the second toner.

16. The method of claim 9, wherein said programming step includes programming the job to produce prints in the first color printing mode with a first color toner and to produce prints in the second color printing mode with a second color toner.

* * * * *